United States Patent Office 2,922,829
Patented Jan. 26, 1960

2,922,829
METHOD OF PRODUCING Δ³-PARA-MENTHENE

Robert Roger Bottoms, Crestwood, Ky., assignor to Chemetron Corporation, Chicago, Ill., a corporation of Delaware No Drawing. Application February 21, 1955
Serial No. 489,754

11 Claims. (Cl. 260—675.5)

This invention relates to a method for producing Δ³-p-menthene. More particularly this invention relates to a method for producing Δ³-p-menthene from dihydro-alpha-terpineol by simultaneous dehydration and isomerization in the presence of an organic sulfonic acid.

Δ³-p-menthene has the formula

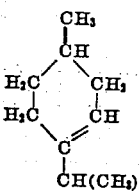

It is hereinafter generally referred to as "menthene." It is a useful starting material in the preparation of synthetic menthol and it has heretofore been relatively inaccessible, having been produced in small quantities from menthol or menthyl chloride. A synthetic method for producing menthene in quantity is therefore highly desirable.

It is the object of this invention to provide a method of producing menthene from readily available materials. It is a further object to provide a method for producing menthene by a simple process in high yield from dihydro-alpha-terpineol. Other objects of the invention will be apparent from the following disclosure.

Dihydro-alpha-terpineol is a terpene alcohol having the following structural formula.

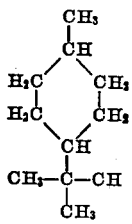

It can be prepared by reducing alpha-terpineol by catalytic hydrogenation and is therefore a readily accessible starting material.

In the past, dihydro-alpha-terpineol has been dehydrated by prolonged heating at high temperatures in the range of 180° to 220° C. with a large proportion of a dehydrating agent such as potassium or sodium bisulfate to form Δ⁴,⁸-p-menthene. The latter is then heated with acid such as dilute sulfuric acid to secure isomerization of the 4,8 double bond into the 3 position in the ring. These reactions have been carried out under rather severe conditions in order to bring about the dehydration and subsequent isomerization. During these reactions a large portion of the material undergoes polymerization to high-boiling and practically non-distillable oils and resins. The yield of the foregoing two-step process is generally less than 50% of theoretical.

By the present invention, it has been discovered that heating dihydro-alpha-terpineol in the range of 100° to 140° C. for a relatively short period of time in the range of a few minutes to about two hours with a small amount of an organic sulfonic acid brings about the simultaneous dehydration and isomerization of dihydro-alpha-terpineol to menthene in practically theoretical yield. The organic sulfonic acids used to catalyze this reaction are low molecular weight organic sulfonic acids of the formula R—SO$_3$H wherein the radical R represents an organic radical having a molecular weight of less than 220, such as the hydroxyphenyl radical. Preferred are sulfonic acids in which R represents hydrocarbon radicals such as those derived from benzene, toluene or lower aliphatic hydrocarbons, such as the lower alkanes. The quantity of sulfonic acid which is employed in the reaction may be as small as 0.2% or may be as large as about 2% by weight of the dihydro-alpha-terpineol used, although larger amounts of sulfonic acids are not detrimental to the process. It is desirable that the sulfonic acid have a molecular weight below about 300 because organic sulfonic acids having molecular weights above this value have a tendency to be soluble in the products and cause emulsification in the subsequent washing process to remove the acids before the menthene is isolated.

By the present invention it is now possible to produce menthene in a continuous process rather than by batch methods which have been used previously. The continuous process results in improved yields and decreased production costs.

The following example will serve to illustrate the invention but it is to be understood that this example is not to be construed as limiting the scope of the invention. Other organic sulfonic acids may be used and the relative proportions of the materials may be varied within the range disclosed above. Throughout the specification and claims temperatures are given in degrees centigrade and amounts of materials in parts by weight.

Example 2,000 parts of alpha-terpineol are placed in an autoclave with about 25 parts of Raney nickel catalyst. Hydrogen is then introduced at a pressure of about 250 lbs. per sq. inch and the reaction mixture is heated to about 125° C. with continuous agitation. Agitation is continued until no further absorption of hydrogen takes place.

The contents of the autoclave are cooled and the resulting dihydro-alpha-terpineol is separated from the catalyst and placed in a still with about 20 parts of mixed lower alkaneosulfonic acid, consisting essentially of a mixture of methanesulfonic, ethanesulfonic and propanesulfonic acids. The reaction mixture is then agitated and heated until water begins to distill over. The distillation of water occurs when the temperature has reached the range from 110° to 125° C. Heating and agitation are continued and the temperature is gradually increased to the range of 135° to 140° C. until practically the theoretical amount of water has been distilled over. There remains in the still practically pure Δ³-p-menthene with the sulfonic acid catalyst.

The Δ³-p-menthene is washed by agitation with cold water or with cold dilute aqueous alkali, to remove the sulfonic acid and then dried and distilled to produce a high purity product with a boiling range of 166° to 167.5° C. at 760 millimeters pressure.

What is claimed as new and desired to be secured by Letters Patent of the United States is:

1. A method of producing Δ³-p-menthene from dihydro-alpha-terpineol which comprises heating dihydro-alpha-terpineol with an organic sulfonic acid at a temperature not greater than about 140° C. and separating the Δ³-p-menthene thus formed.

2. A method of producing Δ³-p-menthene from dihydro-alpha-terpineol which comprises heating dihydroalpha-terpineol with an organic sulfonic acid to a temperature sufficient to evaporate the water evolved but not greater than about 140° C. and separating the $\Delta^3$-p-menthene thus formed.

3. A method of producing $\Delta^3$-p-menthene from dihydro-alpha-terpineol which comprises heating dihydro-alpha-terpineol with an organic sulfonic acid to a temperature sufficient to evaporate the water evolved but not greater than about 140° C. for a period of time sufficient to remove at least 90% of the theoretical amount of water and then separating the $\Delta^3$-p-menthene thus formed.

4. A method of producing $\Delta^3$-p-menthene from dihydro-alpha-terpineol which comprises heating dihydro-alpha-terpineol with an organic sulfonic acid at a temperature in the range of about 110° to 140° C. to remove the water evolved and separating the $\Delta^3$-p-menthene thus formed.

5. A method of producing $\Delta^3$-p-menthene from dihydro-alpha-terpineol which comprises heating dihydro-alpha-terpineol with 0.2% to 2% by weight of an organic sulfonic acid at a temperature in the range of about 110° to 140° C. to remove the water evolved and separating the $\Delta^3$-p-menthene thus formed.

6. A method of producing $\Delta^3$-p-menthene from dihydro-alpha-terpineol which comprises heating dihydro-alpha-terpineol with 0.2% to 2% by weight of a hydrocarbon sulfonic acid at a temperature in the range of about 110° to 140° C. to remove the water evolved and separating the $\Delta^3$-p-menthene thus formed.

7. A method of producing $\Delta^3$-p-menthene from dihydro-alpha-terpineol which comprises heating dihydro-alpha-terpineol with 0.2% to 2% by weight of lower alkanesulfonic acid at a temperature in the range of about 110° to 140° C. to remove the water evolved and separating the $\Delta^3$-p-menthene thus formed.

8. A method of producing $\Delta^3$-p-menthene from dihydro-alpha-terpineol which comprises heating dihydro-alpha-terpineol with 0.2% to 2% by weight of lower alkanesulfonic acid at a temperature in the range of about 110° to 140° C. until substantially one mole of water is removed from each mole of dihydro-alpha-terpineol and separating the $\Delta^3$-p-menthene thus formed.

9. A method of producing $\Delta^3$-p-menthene from dihydro-alpha-terpineol which comprises heating dihydro-alpha-terpineol with 1% by weight of lower alkanesulfonic acid at a temperature in the range of about 110° to 140° C. to remove the water evolved and separating the $\Delta^3$-p-menthene thus formed.

10. A method of producing $\Delta^3$-p-menthene from dihydro-alpha-terpineol which comprises heating dihydro-alpha-terpineol with 1% by weight of lower alkanesulfonic acid at a temperature in the range of about 110° to 140° C., collecting the water evolved until substantially the theoretical amount is collected, washing the organic residue with water to remove sulfonic acid, and separating the $\Delta^3$-p-menthene thus obtained.

11. A method of producing $\Delta^3$-p-menthene from dihydro-alpha-terpineol which comprises mixing dihydro-alpha-terpineol with 1% by weight of lower alkanesulfonic acids comprising methanesulfonic, ethanesulfonic acids, and propanesulfonic acids, heating said mixture in a still at a temperature in the range of about 110° to 140° C., collecting the water distilled until substantially one mole of water is collected for each mole of dihydro-alpha-terpineol used, washing the still residue with water to remove acids, separating the hydrocarbon fraction and purifying the $\Delta^3$-p-menthene by distillation.

References Cited in the file of this patent
UNITED STATES PATENTS

| | | |
|---|---|---|
| 1,999,061 | Schoeller et al. | Apr. 23, 1935 |
| 2,376,286 | Smith et al. | May 15, 1945 |

OTHER REFERENCES

Nazarov et al.: (U.S.S.R.) Trans. Exptl. Research Lab. Khemgas., (1936) (abs'd in Chem. Abstracts, vol. 31 (1937), page 6187[6]).

Egloff et al.: Isomerization of Pure Hydrocarbons, Reinhold Pub. Corp., N.Y., N.Y. (1942), pages 338–339.

Dole et al.: (India), J. Proc. Oil Technol. Assoc., (1952) (abstracted in Chem. Abstracts, vol. 48 (1954), page 9084B).